Nov. 26, 1963   R. E. BROCKWELL   3,111,963
NOVEL FLOW DEVICE
Filed April 24, 1961

INVENTOR.
Richard E. Brockwell
BY
ATTORNEY

United States Patent Office 3,111,963
Patented Nov. 26, 1963

3,111,963
NOVEL FLOW DEVICE
Richard E. Brockwell, Oak Ridge, Tenn., assignor to the United States of America as represented by the United States Atomic Energy Commission
Filed Apr. 24, 1961, Ser. No. 105,245
2 Claims. (Cl. 138—39)

The present invention relates generally to hollow articles having porous walls and a method of fabrication thereof. More particularly, it relates to novel porous-walled hollow articles in which the pore size and direction may be carefully controlled within small limits.

Porous-walled members are useful in many different situations. For example, hollow, porous-walled articles are highly useful as bearings or journals, since a lubricant can be supplied to the bearing surface through the porous wall of the member. Thus, a porous-walled hollow article having a cylindrically shaped interior volume is a useful bearing for a turning shaft, lubrication being accomplished by slowly forcing a lubricant from the exterior surface of the bearing through the porous wall to the interior bearing surface. A porous member having a conically, hemispherically, or spherically shaped interior volume is similarly useful as a thrust bearing.

Porous-walled hollow members are also useful as filters and size classifiers.

Moreover, porous-walled hollow members having pores which tangentially approach their interior volumes are particularly useful as vortex generators. A fluid, either gaseous or liquid, is introduced into the interior volume through the tangential pores, forming upon emerging therein a pattern of vortex flow.

Normally, porous substances, from which articles of the character described could be fabricated, are unsuitable for such use: they are unsuitable for vortex generators because the pores of such natural materials are randomly oriented, and they are unsuitable for use as bearings because of their generally poor mechanical properties. Moreover, the pore size of such materials is not uniform and is difficult to control.

It is, therefore, a general object of the present invention to provide an improved hollow article having porous walls.

Another object of the invention is to provide a porous-walled article which is fabricable from a wide range of materials, including materials which are non-porous.

The provision of a porous-walled article in which the pores may be oriented in any desired direction is a further object of the invention.

A further object is the provision of a porous tube having pores of uniform and known size.

A still further object of the invention is to provide a porous tube having pores of uniform and known size oriented in a direction which is tangential to the surface of its interior volume.

Other objects of the invention will become apparent from the following description and the drawings appended thereto, wherein.

In accordance with the present invention, the above-listed objects are attained by providing a porous-walled hollow article comprising a multiplicity of centrally-apertured, coaxially-stacked plates or discs, with at least one surface of at least a portion of the discs being provided with grooves extending outwardly from their central aperture to their periphery.

The apertured plates may be circular in shape and of uniform size with uniformly sized circular apertures, the resultant assembled tube in that instance being cylindrical in shape with a central cylindrical channel, or of uniform or varying size with uniform or varying sized central apertures, an assembly of which could take the form of a cone, hemisphere, or any other desired configuration.

The plates may be fabricated from any material which can be provided with a flat surface upon which grooves can be formed. Thus, metals, many ceramics, and refractory materials are suitable for use in the invention.

The grooves may be formed on the surface of the plates in any suitable manner. For example, chemical etching, machining, pressing, or abrading with abrasive particles carried by a gas stream are all suitable means. In addition to the novel porous article described above, there is provided, as will be more fully apparent below, a method for fabricating such an article, including a novel technique of pressing grooves into the surface of the discs which affords a very uniform and controlled groove size and groove direction.

Grooves may be provided on only one surface of each plate and the article assembled so that the grooved surface of each plate mates with the ungrooved surface of the plate adjacent to it. Grooves may also be provided on only a few plates or on both surfaces of every plate. It is, however, preferable that a grooved surface be opposed by an ungrooved surface. Thus, in order to get the maximum porosity in a given length of tube and to minimize the number of discs which must be grooved, it is preferable to provide grooves on both surfaces of every other disc and to assemble a tube so that a blank disc is interposed between each pair of grooved discs.

Figure 1:
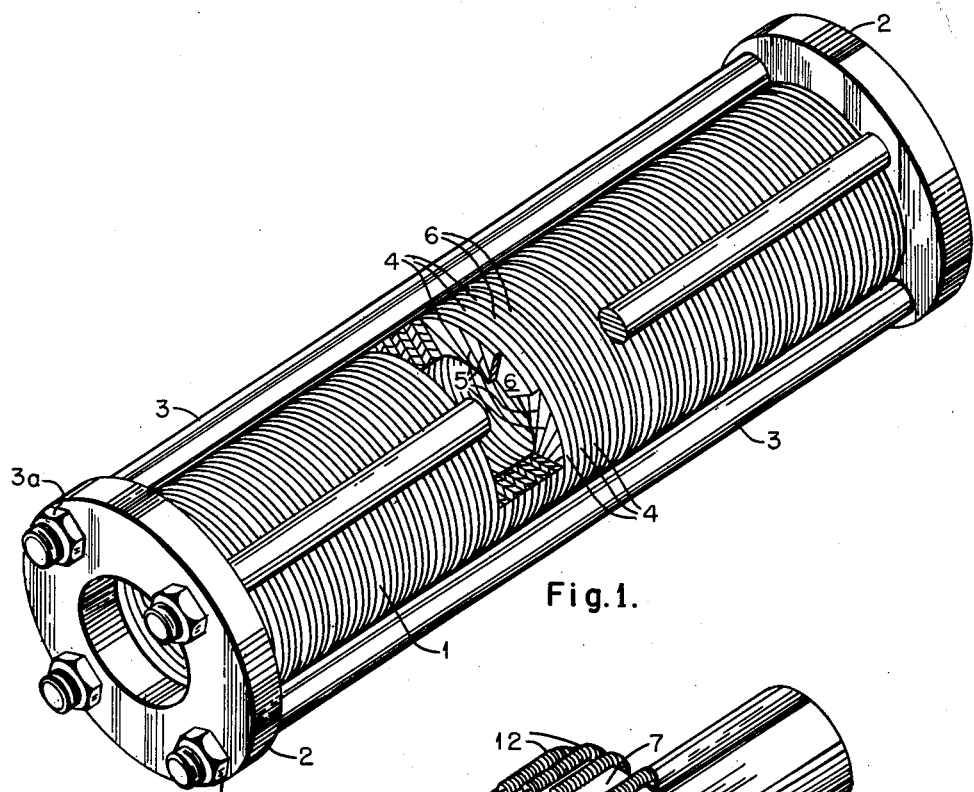
FIG. 1 is an isometric view of a porous tube constructed according to the present invention.
Figure 2:
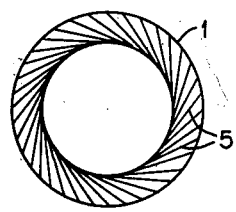
FIG. 2 is a view of one disc from the tube of FIG. 1.

To illustrate the invention in greater detail reference is made to the drawings, initially to FIGS. 1 and 2, which are views of an assembled tube and a single apertured plate, respectively. A multiplicity of apertured, co-axially-stacked plates 1 are held in longitudinal compression by apertured end plates 2 which are adjustably secured together by four tie bolts 3 provided with nuts 3a. Alternate plates 4 in the assembly are provided with a multiplicity of tangential grooves 5 on both surfaces, with the intermediate discs 6 being blank, that is, having no grooves. Thus, the assembly illustrated is penetrated by a multiplicity of small, tangential pores, the number and size of which are known. Such an assembly is, as has been pointed out hereinbefore, very useful as a vortex generator.

Figure 3:
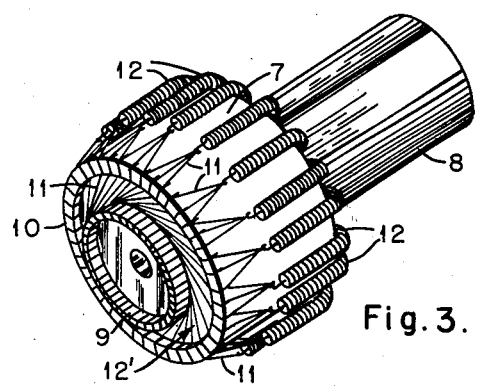
FIG. 3 is a forming die adapted for the impression of grooves on the surfaces of the discs of the tube of FIG. 1.

Turning now to FIG. 3, which is a view of a forming die adapted to form grooves in the surfaces of the above-described discs, a cylindrical die head 7, fabricated from tool steel, is carried by a shaft 8 and is provided with a circular, protruding, slotted inner ring 9, the outer diameter of which is slightly smaller than the diameter of the aperture of the plate of FIG. 2. A similar protruding slotted outer ring 10, the inner diameter of which is slightly larger than the diameter of the plate of FIG. 2, is provided around the periphery of the die head. A plurality of tungsten wires 11, which are attached to the slots of inner ring 9, are tautly stretched, by means of springs 12, across the annular face 12 of die head 7 in tangential relationship to inner ring 9. In operation, the tangential wires located in annular region 12 of the forming die are pressed into the annular surface of a disc. This type of forming die is highly advantageous for forming the required grooves because the groove size is determined by the wire size, which is known and easily controlled.

As a further illustration of the invention, the following example is offered.

Example

Each of five hundred brass discs having an outer diameter of 1.5 inches, a central aperture 1.0 inch in diameter, and a thickness of 4 mils were provided with 288 tangential grooves (144 equally spaced grooves on each surface) by pressing 2 mil diameter tungsten wire into the disc surface to a depth of 0.001 inch. Five hundred ungrooved brass discs having an outer diameter of 1.5 inches, a central aperture 1.0 inch in diameter, and a thickness of 2 mils were prepared. The grooved and ungrooved discs were assembled between two apertured steel end plates on a one-inch diameter mandrel in such a manner that every other disc in the assembly was a grooved disc, each grooved disc thus being separated from the next adjacent grooved disc by a plain ungrooved disc. The assembled discs were placed in compression by tightening the nuts on four longitudinal tie bolts connecting the apertured end plates. The resultant assembly was approximately six inches in length and contained 288,000 tangential pores of equal diameter uniformly distributed both circumferentially and longitudinally.

Since many deviations from and modifications of the illustrative embodiment described above may be made without departing from the scope of the present invention, it is intended that the invention be limited only by the claims appended hereto.

Having described the invention, what is claimed is:

1. A porous-walled, hollow article comprising a multiplicity of centrally-apertured, coaxially stacked plates formed from a non-porous material, both surfaces of a portion of the plates in said article being provided with grooves extending outwardly from their central aperture to their periphery and a portion of said plates being ungrooved, said grooved and ungrooved plates being stacked alternately.

2. The article of claim 1 wherein said grooves extend outward tangentially from said central aperture.

References Cited in the file of this patent

UNITED STATES PATENTS

| | | |
|---|---|---|
| 1,700,565 | Ernst et al. | Jan. 29, 1929 |
| 2,185,999 | Johnson | Jan. 9, 1940 |
| 2,346,647 | Bennison | Apr. 18, 1944 |
| 2,450,339 | Hensel | Sept. 28, 1948 |
| 2,454,982 | Wallace | Nov. 30, 1948 |

FOREIGN PATENTS

| | | |
|---|---|---|
| 126,722 | Australia | Feb. 5, 1948 |
| 433,260 | Italy | Apr. 5, 1948 |
| 987,457 | France | Dec. 30, 1951 |
| 203,496 | Australia | Sept. 27, 1956 |
| 214,774 | Australia | May 14, 1958 |